United States Patent [19]
Woody

[11] Patent Number: 5,381,267
[45] Date of Patent: Jan. 10, 1995

[54] MOVABLE HEAD-UP-DISPLAY (HUD) COMBINER ASSEMBLY INCLUDING LOCKING LINKAGE MECHANISM

[75] Inventor: George R. Woody, Redondo Beach, Calif.

[73] Assignee: Hughes Aircraft Company, Los Angeles, Calif.

[21] Appl. No.: 44,786

[22] Filed: Apr. 12, 1993

[51] Int. Cl.⁶ .............................................. G02B 27/14
[52] U.S. Cl. ...................................... 359/632; 359/630
[58] Field of Search ............... 359/632, 630, 13, 15, 359/819, 872; 16/233, 274, 293, 291

[56] References Cited

U.S. PATENT DOCUMENTS

| | | | |
|---|---|---|---|
| 3,503,146 | 3/1970 | Woplin | 359/630 |
| 3,552,828 | 1/1971 | Lawrence | 359/632 |
| 3,620,601 | 11/1971 | Waghorn | 359/632 |
| 4,664,475 | 5/1987 | Ferrer | 359/15 |
| 4,725,125 | 2/1988 | Ellis | 359/632 |
| 4,775,218 | 10/1988 | Wood et al. | 359/14 |

Primary Examiner—Eugene R. LaRoche
Assistant Examiner—A. Zarabian
Attorney, Agent, or Firm—Terje Gudmestad; W. K. Denson-Low

[57] ABSTRACT

A four bar linkage (46) supports a head-up-display (HUD) combiner (12) for movement between an upper storage position and a lower operating position. A stop and overcenter mechanism (28a,58;28b,52a;48,52) securely locks the combiner (12) in the operating position. A switch (60) is actuated by the linkage (46) when the combiner (12) is in the operating position.

14 Claims, 3 Drawing Sheets

MOVABLE HEAD-UP-DISPLAY (HUD) COMBINER ASSEMBLY INCLUDING LOCKING LINKAGE MECHANISM

BACKGROUND OF THE INVENTION

1. Field of the Invention

The present invention generally relates to the art of avionics, and more specifically to a combiner assembly for a head-up-display (HUD) including a linkage mechanism which enables the combiner to be moved to and locked in an upper storage position or a lower operating position.

2. Description of the Related Art

A HUD provides a pilot with aircraft flight status information superimposed on a direct visual view through the front window. The pilot is freed from having to constantly shift sight from the window to dials in the cockpit in the conventional manner. This capability can provide a crucial advantage during high speed flight maneuvers, and during take-offs and landings in which conditions can deteriorate rapidly.

As illustrated in FIG. 1, a HUD display 10 to which the present invention relates includes a holographic mirror combiner 12 which is located between a pilot 14 and a front window 16 of an aircraft in a lower operating position as illustrated in solid line. A flight information or HUD image is projected onto the combiner 12 by a projector 18 which is mounted on a fuselage 20 of the aircraft above the pilot 14.

The combiner 12 is transparent to the pilot's view through the window 16, but reflects the image from the projector 18 such that it is visible by the pilot 14 superimposed on the direct view. The HUD image can be a radar display of the ground below the aircraft, or an information display including symbols designating flight parameters such as horizon, course, heading, altitude, airspeed, etc.

The combiner 12 is supported by a linkage mechanism 22 embodying the present invention, and is movable by the pilot 14 between the lower operating position and an upper storage position as illustrated in broken line. The combiner 12 is clear of the pilot's field of view in the storage position. The pilot 14 is seated sufficiently rearward of the combiner 12 such that the combiner 12 will not strike the pilot 14 while it is being moved between the operating and storage positions.

A prior art mechanism which performs the function of the present mechanism 22 is disclosed in U.S. Pat. No. 4,775,218, entitled "COMBINER ALIGNMENT DETECTOR FOR HEAD UP DISPLAY SYSTEM" issued Oct. 4, 1988 to R. Wood et al, and includes a pivotal bracket which supports the combiner.

Detent mechanisms including spring loaded, tapered pins which fit into tapered holes are provided for holding the bracket and combiner in the operating or stowed position. The detent mechanisms require precision machining, are subject to wear and are not dependable in that the combiner must often be bumped to fully engage the detents.

U.S. Pat. No. 4,664,475, entitled "COMBINER MOUNTING AND STOWAGE MECHANISM", issued May 12, 1987 to J. Ferrer, discloses a four bar linkage for moving a combiner between an upper operating position and a lower stowed position. The combiner is supported by two movable links, and the linkage is moved between the two positions by a slide arrangement.

The slide is held in the operating position by a detent. This arrangement is disadvantageous in that the slide and detent are subject to wear which causes the mechanism to become progressively loose and eventually fail to securely hold the combiner in the operating position.

SUMMARY OF THE INVENTION

In a movable head-up-display (HUD) combiner assembly embodying the present invention, a four bar linkage moves a combiner between an upper storage position and a lower operating position. A stop and overcenter mechanism securely locks the combiner in the operating position. A switch is actuated by the linkage when the combiner is in the operating position.

The four bar linkage includes a fixed link, a movable primary link which is pivotally connected to the fixed link and carries the combiner, a movable secondary link which is pivotally connected to the fixed link and has an operating handle attached thereto, and a movable connecting link which is pivotally connected to the primary link and to the secondary link.

The primary link abuts against a primary stop when the combiner is in the operating position. A joint which connects the secondary link to the connecting link is movable to an overcenter position in which it abuts against a secondary stop which is integral with the primary link, thereby locking the four bar linkage and combiner in the operating position. The switch is mounted in a cavity formed in the primary link and actuated by the joint when it abuts against the secondary stop.

Although specifically designed for supporting a HUD combiner, the present linkage mechanism has utility in itself and can be used to support other objects for movement between two locked positions.

These and other features and advantages of the present invention will be apparent to those skilled in the art from the following detailed description, taken together with the accompanying drawings, in which like reference numerals refer to like parts.

DETAILED DESCRIPTION OF THE INVENTION

Figure 1:
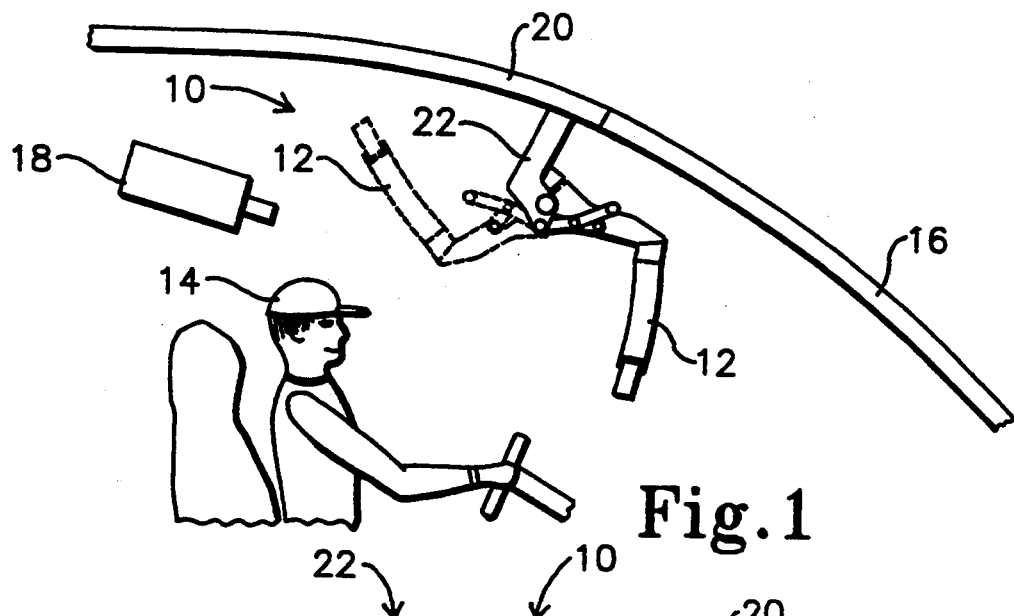
FIG. 1 is a diagram illustrating a head-up-display (HUD) to which the present invention relates.
Figure 2:
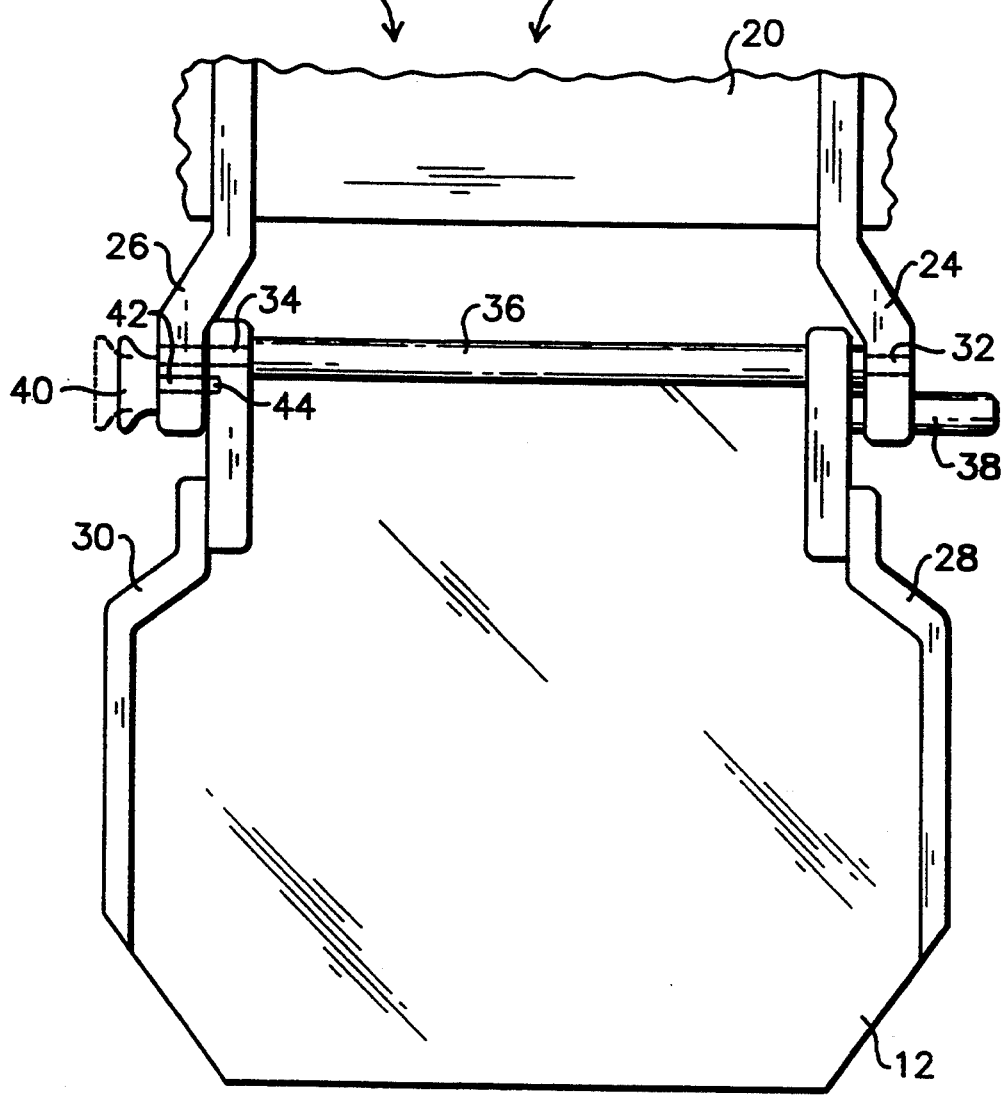
FIG. 2 is a rear elevational view illustrating a HUD combiner assembly embodying the present invention in a lower operating position as viewed by a pilot.

The present combiner 12 and linkage mechanism 22 are illustrated in FIG. 2 as viewed from behind by the pilot 14 in the lower operating position of FIG. 1. The mechanism 22 includes right and left bracket arms 24 and 26 respectively which are fixed to the fuselage 20 of the aircraft and extend downwardly therefrom.

Right and left brackets 28 and 30 are pivotally connected to and supported by the bracket arms 24 and 26 about a first pivot pin 32 and another pin 34 respectively, and securely clamp the combiner 12 therebetween. The brackets 28 and 30 are interconnected by a torsion bar 36 such that the brackets 28 and 30, torsion bar 36 and combiner 12 are pivotal as in integral unit about the pins 32 and 34 by means of an operating handle 38.

A knob 40 has a pin 42 which extends therefrom through the bracket arm 26 and fits into a hole 44 in the bracket 30 when the mechanism 22 and combiner 12 are in the upper storage position. Although not illustrated explicitly, the knob 40 is spring loaded such that the pin 42 is urged rightwardly as viewed in FIG. 2.

A ramp (not shown) is formed on the left surface of the bracket 30 adjacent to the hole 44 such that the end of the pin 42 rides up the ramp and drops into the hole 44 when the bracket 30 reaches the storage position. This locks the bracket 30 to the bracket arm 26 and thereby locks the mechanism 22 and combiner 12 in the storage position. The mechanism 22 and combiner 12 can be unlocked for movement from the storage position to the operating position by pulling out the knob 40 so that the pin disengages from the hole 44.

Figure 3:
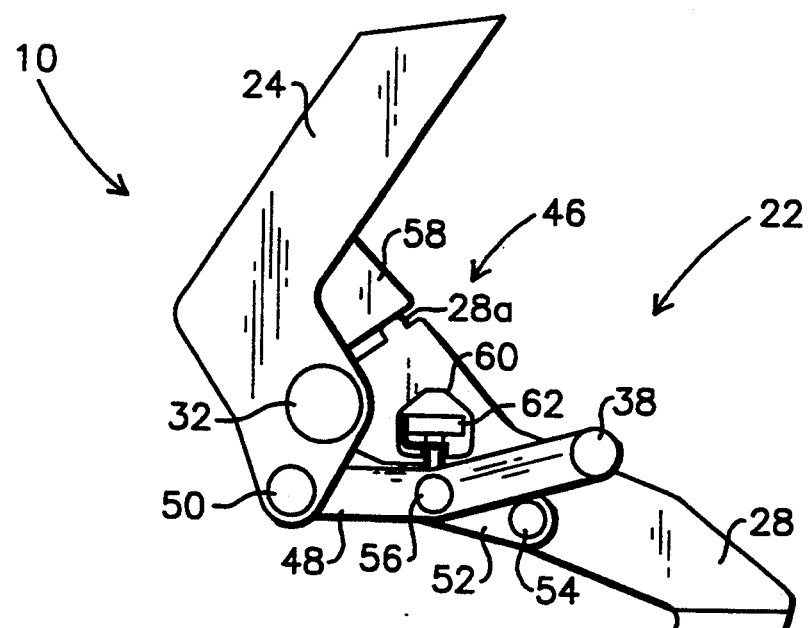
FIG. 3 is a side elevational view illustrating the assembly in the lower operating position.
Figure 4:
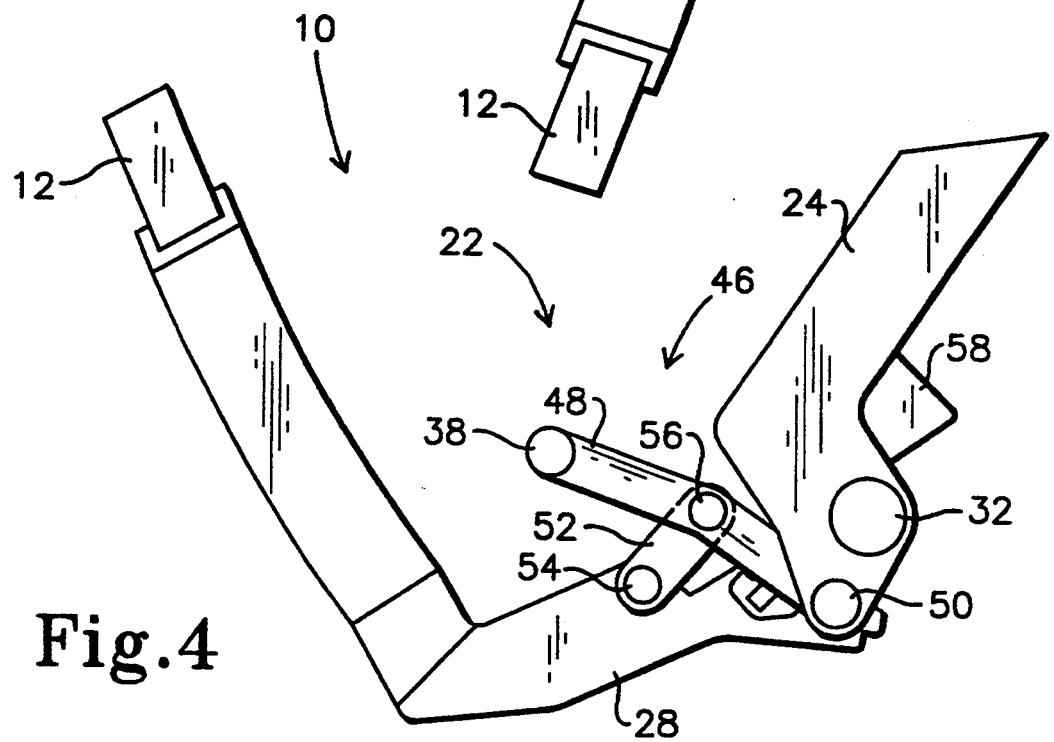
FIG. 4 is similar to FIG. 3, but illustrates the assembly in an upper storage position.

The mechanism 22 and combiner 12 are viewed from the right side as illustrated in FIGS. 3 and 4 in the operating and storage positions respectively. The mechanism 22 includes a four bar linkage 46. The right bracket arm 24 constitutes a first or fixed link of the linkage 46, whereas the right bracket 28 constitutes a second or movable primary link thereof.

A lever 48, which constitutes a third or movable secondary link of the linkage 46, is pivotally connected at one end to the bracket arm 24 by a second pivot pin 50. One end of a fourth or connecting link 52 is pivotally connected to the bracket 28 by a third pivot pin 54. The other end of the connecting link 52 is pivotally connected to the lever 48 an intermediate position thereof by a fourth pivot pin 56. The operating handle 38 is attached to the other end of the lever 48.

Figure 5:
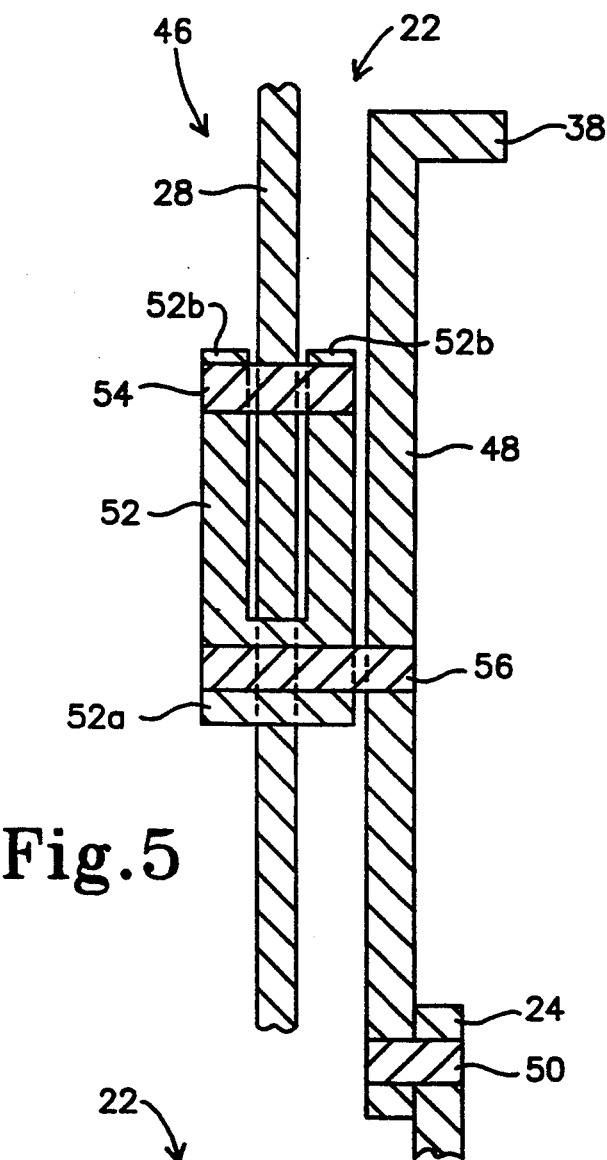
FIG. 5 is a plan view illustrating a four bar linkage mechanism of the assembly.

The four bar linkage 46 is illustrated as viewed from above in FIG. 5. The connecting link 52 preferably has a bifurcated shape as shown, with the pin 56 extending through a base portion 52i a of the link 52 and the pin 54 extending through bifurcations 52b thereof.

Figure 6:
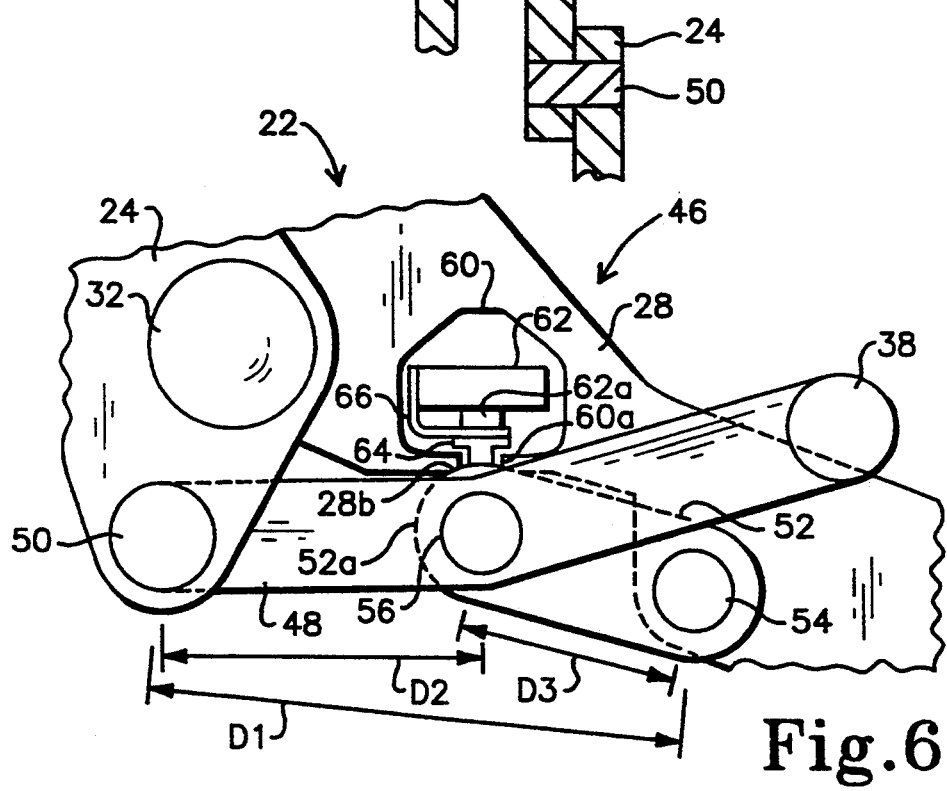
FIG. 6 is a fragmentary side elevational view, to enlarged scale, illustrating a secondary stop and locking mechanism of the assembly.

As viewed in FIGS. 3 and 6, the mechanism 22 further includes a primary stop member 58 which is integral with the bracket arm 24. In the illustrated operating position of the mechanism 22 and combiner 12, a projection 28a which extends integrally from the bracket 28 abuts against the primary stop member 58. A circular depression 28b is formed in the lower edge of the bracket 28 which constitutes a secondary stop member. The base portion 52a of the connecting link 52 abuts against the wall of the depression 28b in the operating position.

The linkage 46 is illustrated in an overcenter position in FIGS. 3 and 6 in which the center of the pin 56 is disposed above a line joining the centers of the pins 50 and 54. This securely locks the mechanism 22 and combiner 12 in the operating position. More specifically, in the overcenter position, a distance D1 between the centers of the pins 50 and 54 is smaller than the sum of distances D2 and D3 between the centers of the pins 50,56 and between the centers of the pins 56,54 respectively.

If an attempt is made to rotate the bracket 28 clockwise about the pin 32 and thereby rotate the mechanism 22 and combiner 12 toward the storage position, the connecting link 52 will be urged to rotate clockwise about the pin 54 and the lever 48 will be urged to rotate counterclockwise about the pin 50.

This will urge the pin 56 and thereby the base portion 52a of the link 52 which is pivotally connected to the pin 56 upward into yet tighter abutment with the depression 28b in the bracket 28. This will also urge the bracket 28 to rotate counterclockwise about the pin 32 such that the projection 28a is urged into yet tighter abutment with the stop member 58. Thus, an attempt to move the mechanism 22 and combiner 12 away from the operating position will lock them yet tighter into the operating position.

The pilot 14 can move the mechanism 22 and combiner 12 from the operating position to the storage position by initially pulling down on the handle 38. This causes the lever 48 to rotate clockwise about the pin 50 and the connecting link 52 to rotate counterclockwise about the pin 54.

The pin 56 moves downwardly from the illustrated overcenter position through a center position in which the pins 50, 54 and 56 are collinear. The dimensions and material of the linkage 46 are selected such that there is sufficient compliance to absorb the compressive stress and strain which exists when the linkage 46 passes through the center position.

Further downward movement of the handle 38 causes the lever 48 and connecting link 52 to move from the center position to an undercenter position in which the pin 56 is located below a line joining the centers of the pins 50 and 54. As the linkage 46 moves past the center position, the mechanism 22 is unlocked and the bracket 28 is pulled clockwise about the pin 32 by the connecting link 52 and pin 54.

The pilot 14 continues to pull the handle 38 downwardly through a vertically downward position and then push the handle 38 upwardly, causing the bracket 28 and combiner 12 to rotate clockwise about the pin 32 to the storage position of FIG. 4. During this process, the lever 48 rotates clockwise about the pin 50 and the connecting link 52 rotates counterclockwise about the pin 54. It will be noted that the pilot 14 can move the mechanism 22 and combiner 12 from the operating position to the storage position using only one hand.

Although not shown, a stop is preferably provided to prevent the mechanism 22 and combiner 12 from rotating clockwise beyond the storage position. The pilot can move the mechanism 22 and combiner 12 from the storage position to the operating position by pulling out the knob 40 to unlock the bracket 30 from the bracket arm 26, initially pull the handle 38 downwardly and then push the handle 38 upwardly as the lever 48 rotates forwardly past its vertical position.

The links of the linkage 46 rotate in directions which are opposite to those described above while moving from the storage position to the operating position. The projection 28a of the bracket 28 abuts against the primary stop member 58 with the lever 48 and connecting link 52 in an under-center position. Further upward movement of the handle 38 causes the lever 48 and link 52 to move through the center position to the overcenter position in which the base portion 52a of the link 52 abuts against the depression 28b in the bracket 28 to lock the mechanism 22 and combiner 12 in the operating position as described above.

As illustrated in FIG. 6, a cavity 60 is formed in the bracket 28. An electrical switch 62 is mounted in the cavity. A hole 60a extends from the cavity 60 and opens into the depression 28b. An actuating pin 64 extends through the hole 60a and is urged toward the depression 28b by a leaf spring 66. The switch 62 includes an actuating plunger 62a which is spring loaded to an extended position in which the switch 62 has one state (open or closed). Depression of the plunger 62a actuates the switch 62 to the opposite state.

The switch 62 indicates when the mechanism 22 and combiner 12 are locked in the operating position, and is connected to an electronic unit (not shown) which, for example, controls the projector 18 to project the HUD image onto the combiner 12 only when the switch 62 is actuated. When the mechanism 22 is not locked, the spring 66 urges the pin 64 toward the depression 52a and enables the spring loading in the switch 62 to move the plunger 62a to its extended position.

When the mechanism is locked, the base portion 52a of the connecting link 52 moves the pin 64 upwardly against the force of the spring 66 and the spring loading in the switch 62, thereby moving the plunger 62a to its retracted position and actuating the switch 62.

While an illustrative embodiment of the invention has been shown and described, numerous variations and alternate embodiments will occur to those skilled in the art, without departing from the spirit and scope of the invention. Accordingly, it is intended that the present invention not be limited solely to the specifically described illustrative embodiment. Various modifications are contemplated and can be made without departing from the spirit and scope of the invention as defined by the appended claims.

I claim:

1. A movable head-up-display (HUD) combiner assembly, comprising:
    a combiner;
    a four bar linkage means for supporting the combiner for movement between an upper storage position and a lower operating position, including:
        a fixed link;
        a movable primary link which is pivotally connected to the fixed link and carries the combiner;
        a movable secondary link which is pivotally connected to the fixed link; and
        a connecting link which is pivotally connected to the primary link and to the secondary link;
    stop means for stopping movement of the primary link when the combiner is moved away from said storage position to said operating position; and
    overcenter lock means for locking the linkage means against the stop means when the combiner is in said operating position.

2. An assembly as in claim 1, further comprising an operating handle which is attached to the secondary link.

3. An assembly as in claim 1, in which:
    the linkage means further comprises joint means for pivotally connecting the secondary link to the connecting link;
    the stop means comprises a primary stop member against which the primary link abuts when the combiner is moved away from said storage position to said operating position; and
    the overcenter means comprises a secondary stop member which is integral with the primary link and against which the joint means abuts when the combiner is in said operating position and the secondary link and the connecting link are moved to an overcenter position.

4. An assembly as in claim 3, further comprising a switch means which is integrally movable with the secondary link and is actuated by the joint means upon abutment thereof against the secondary stop member.

5. An assembly as in claim 1, in which the linkage means further comprises:
    first joint means for pivotally connecting the primary link to the fixed link;
    second joint means for pivotally connecting the secondary link to the fixed link;
    third joint means for pivotally connecting the connecting link to the primary link; and
    fourth joint means for pivotally connecting the connecting link to the secondary link.

6. An assembly as in claim 5, in which:
    the stop means comprises a primary stop member against which the primary link abuts when the combiner is moved away from said storage position to said operating position; and
    the overcenter means comprises a secondary stop member which is integrally movable with the secondary link and against which the fourth joint means abuts when the combiner is in said operating position and the secondary link and the connecting link are moved to an overcenter position.

7. An assembly as in claim 6, in which the linkage means is dimensioned such that the distance between the second joint means and the third joint means is smaller than the sum of the distances between the second joint means and the fourth joint means; and between the third joint means and the fourth joint means; when the secondary link and the connecting link are in said overcenter position.

8. An assembly as in claim 7, further comprising a switch means which is integrally movable with the secondary link and is actuated by the fourth joint means upon abutment thereof against the secondary stop member.

9. A linkage mechanism, comprising:
    a four bar linkage means including:
        a fixed link;
        a movable primary link which is pivotally connected to the fixed link;
        a movable secondary link which is pivotally connected to the fixed link; and
        a movable connecting link which is pivotally connected to the primary link and to the secondary link;
    an operating handle which is attached to the secondary link;
    stop means for stopping movement of the primary link when the linkage means is moved in a predetermined direction to a predetermined position; and
    overcenter lock means for locking the primary link against the stop means when the linkage means is in said predetermined position.

10. A linkage mechanism, comprising:
    a four bar linkage means including:
        a fixed link;
        a movable primary link which is pivotally connected to the fixed link;
        a movable secondary link which is pivotally connected to the fixed link a movable connecting link which is pivotally connected to the primary link and to the secondary link;

joint means for pivotally connecting the secondary link to the connecting link;

stop means comprises a primary stop member against which the primary link abuts when the linkage means is moved in a predetermined direction to a predetermined position; and overcenter lock means comprises a secondary stop member which is integral with the secondary link and against which the joint means abuts when the linkage means is in said predetermined position and the secondary link and the connecting link are moved to an overcenter position.

11. A mechanism as in claim 10, further comprising a switch means which is integrally movable with the secondary link and is actuated by the joint means upon abutment thereof against the secondary stop member.

12. A link mechanism comprising:
a four bar linkage means including:
a fixed link;
a movable primary link which is pivotally connected to the fixed link;
a movable secondary link which is pivotally connected to the fixed link;
a movable connecting link which is pivotally connected to the primary link and to the secondary link;
first joint means for pivotally connecting the primary link to the fixed link;
second joint means for pivotally connecting the secondary link to the fixed link;
third joint means for pivotally connecting the connecting link to the primary link;
fourth joint means for pivotally connecting the connecting link to the secondary link;
stop means comprises a primary stop member against which the secondary link abuts when the linkage means is moved in a predetermined direction to a predetermined position; and
overcenter means comprises a secondary stop member which is integrally movable with the secondary link and against which the fourth joint means abuts when the linkage means is in said operating position and the secondary link and the connecting link are moved to a center position.

13. A mechanism as in claim 12, in which the linkage means is dimensioned such that the distance between the second joint means and the third joint means is smaller than the sum of the distances between the second joint means and the fourth joint means; and between the third joint means and the fourth joint means; when the secondary link and the connecting link are in said center position.

14. A mechanism as in claim 13, further comprising a switch means which is integrally movable with the secondary link and is actuated by the fourth joint means upon abutment thereof against the secondary stop member.

* * * * *